US009663609B2

(12) United States Patent
Eichhorn et al.

(10) Patent No.: US 9,663,609 B2
(45) Date of Patent: May 30, 2017

(54) USE OF N,N'-(DIMETHYL) URONES AND METHOD FOR CURING EPOXY RESIN COMPOSITIONS

(71) Applicant: ALZCHEM AG, Trostberg (DE)

(72) Inventors: Torsten Eichhorn, Traunstein (DE); Claudia Winkler, Altenmarkt (DE); Martin Ebner, Kissing (DE); Hans-Peter Krimmer, Kirchweidach (DE)

(73) Assignee: ALZCHEM AG, Trostberg (DE)

( * ) Notice: Subject to any disclaimer, the term of this patent is extended or adjusted under 35 U.S.C. 154(b) by 0 days.

(21) Appl. No.: 14/357,030

(22) PCT Filed: Nov. 14, 2012

(86) PCT No.: PCT/EP2012/072593
§ 371 (c)(1),
(2) Date: May 8, 2014

(87) PCT Pub. No.: WO2013/072356
PCT Pub. Date: May 23, 2013

(65) Prior Publication Data
US 2014/0357762 A1 Dec. 4, 2014

(30) Foreign Application Priority Data

Nov. 15, 2011 (DE) .................. 10 2011 118 760

(51) Int. Cl.
C08G 59/40 (2006.01)
C08G 59/14 (2006.01)
C08L 63/00 (2006.01)

(52) U.S. Cl.
CPC ..... C08G 59/4021 (2013.01); C08G 59/1477 (2013.01); C08L 63/00 (2013.01)

(58) Field of Classification Search
None
See application file for complete search history.

(56) References Cited

U.S. PATENT DOCUMENTS

| | | | |
|---|---|---|---|
| 2,993,044 A | 7/1961 | Applegath et al. | |
| 3,274,231 A | 9/1966 | Kobayashi | |
| 3,386,955 A | 6/1968 | Nawakowski et al. | |
| 3,386,956 A | 6/1968 | Nawakowski | |
| 3,454,669 A | 7/1969 | Laudise | |
| 3,717,612 A * | 2/1973 | Babayan | C08G 59/4021 525/374 |
| 3,753,680 A | 8/1973 | Tilles | |
| 3,789,071 A | 1/1974 | Babayan | |
| 3,885,042 A | 5/1975 | Mulder | |
| 4,283,520 A | 8/1981 | Moser et al. | |
| 4,360,649 A | 11/1982 | Kamio et al. | |
| 4,410,457 A | 10/1983 | Fujimura et al. | |
| 5,043,102 A | 8/1991 | Chen et al. | |
| 5,214,098 A | 5/1993 | Setiabudi et al. | |
| 6,231,800 B1 * | 5/2001 | Togashi | B29C 45/2756 264/328.16 |
| 7,750,107 B2 | 7/2010 | Antelmann et al. | |
| 9,499,684 B2 | 11/2016 | Brandl et al. | |
| 2002/0007022 A1 | 1/2002 | Oosedo et al. | |
| 2007/0027274 A1 | 2/2007 | Antelmann et al. | |
| 2009/0197051 A1 * | 8/2009 | Swan | C09J 7/043 428/182 |
| 2010/0247922 A1 * | 9/2010 | Shah | C09D 5/082 428/418 |
| 2011/0027695 A1 | 2/2011 | Shimizu et al. | |
| 2011/0130479 A1 * | 6/2011 | Kramer | C08G 18/10 521/178 |
| 2013/0079488 A1 | 3/2013 | Hitzler et al. | |
| 2014/0308863 A1 | 10/2014 | Brandl et al. | |
| 2016/0083575 A1 | 3/2016 | Hitzler et al. | |

FOREIGN PATENT DOCUMENTS

| | | |
|---|---|---|
| DE | 01720200 | 6/1971 |
| DE | 2304789 | 8/1973 |
| DE | 2236339 | 2/1974 |
| DE | 3217723 | 12/1982 |
| DE | 10324486 | 12/2004 |
| DE | 102010020882 | 11/2011 |
| EP | 298742 | 1/1989 |
| EP | 429395 | 5/1991 |
| EP | 0462456 | 12/1991 |
| EP | 603131 | 6/1994 |
| EP | 2295483 | 3/2011 |
| EP | 2306570 | 4/2011 |
| FR | 1570670 A1 * | 6/1969 |
| GB | 1153639 | 5/1969 |
| GB | 2300187 | 10/1996 |
| JP | 60011458 | 1/1985 |

(Continued)

OTHER PUBLICATIONS

HCAPLUS accesion No. 2010:633650, Derwent accession No. 2010-F96374 and abstract for Chinese Patent No. 101709195 A, May 19, 2010, Gao et al., six pages.*
Chemical abstracts registry No. 10097-09-03 for Omicure U 52, 4,4'-methylenediphenylene bis(dimethylurea), 1968, one page.*
German Application No. DE102011118760.0 , German Search Report dated Aug. 14, 2012.
International Application No. PCT/EP2012/072593 , International Search Report dated Feb. 18, 2013.
German Application No. DE102011118501.5 , "German Search Report dated Sep. 20, 2012".
International Application No. PCT/EP2012/072588 , International Search Report dated Jul. 5, 2013.
International Application No. PCT/EP2012/072588 , "International Preliminary Report on Patentability dated May 30, 2014".
Abendroth et al., "Structure-isomeric hydrazones", Angewandte Chemie, vol. 71, 1959, p. 283, 1 page.

(Continued)

Primary Examiner — Marc Zimmer
(74) Attorney, Agent, or Firm — Kilpatrick Townsend & Stockton LLP

(57) ABSTRACT

The invention relates to the use of bis- or multifunctional N,N'-(dimethyl) urons as curing agents for curing epoxy resin compositions in a controlled manner.

14 Claims, No Drawings

(56) References Cited

FOREIGN PATENT DOCUMENTS

| JP | 2003-39505 A1 * | 2/2003 |
|---|---|---|
| JP | 2004256729 | 9/2004 |
| JP | 2006152170 | 6/2006 |
| JP | 2008204895 | 9/2008 |
| JP | 2011074298 | 4/2011 |
| SU | 1502585 A1 * | 8/1989 |
| SU | 1574618 | 6/1990 |
| WO | 9527761 | 10/1995 |
| WO | 2004106402 | 12/2004 |
| WO | 2007062853 | 6/2007 |
| WO | 2011144659 | 11/2011 |

OTHER PUBLICATIONS

Adams et al., "Do Deprotonated Semicarbazones Undergo the Negative-ion Beckmann Rearrangement in the Gas Phase?", Rapid Communications in Mass Spectrometry, vol. 4, No. 8, Aug. 1990, pp. 275-276, 2 pages.

Chandra et al., "Manganese(II) Complexes of Cyclohexanone Semicarbazone and Cyclohexanone Thiosemicarbazone", Gazetta Chimica Italiana, vol. 110, 1980, pp. 207-210, 3 pages, (Best Available Copy).

Chanley et al., "Long-cain Aliphatic Semicarbazides", J. Am. Chem. Soc., vol. 75, No. 20, 1953, pp. 5113-5114, 2 pages (Best Available Copy).

German Application No. DE102010020882.5 , "Search Report", May 18, 2010, 2 pages (No Translation Available).

Hadzi et al., "The NH Stretching Band and the Molecular Configuration of Acyl Hydrazones and Semicarbazones", Spectrochimica Acta Part A: Molecular Spectroscopy, vol. 23, Issue 3, Mar. 1967, pp. 571-577, 7 pages.

Lee et al., Handbook of Epoxy Resins, 1967, 3 pages.

Naves et al., "Sur les spectres d'absorption infrarouge, entre 2,5 et 16, de semicarbazones", Helvetica Chimica Acta, vol. 50, Issue 6, 1967, pp. 1461-1468, 9 pages (Best Available Copy).

Pandeya et al., "Synthesis and Biological Activity of Substituted Aryl Semicarbazones", Acta Ciencia Indica, vol. XXXIII C; No. 1, 2007, pp. 85-92, 8 pages.

International Application No. PCT/EP2011/058042 , "International Search Report", Aug. 29, 2011, 3 pages.

U.S. Appl. No. 13/643,119, "Notice of Allowance", May 6, 2016, 9 pages.

U.S. Appl. No. 14/357,049, "Non-Final Office Action", May 9, 2016, 32 pages.

U.S. Appl. No. 14/954,560, "Notice of Allowance", mailed Aug. 18, 2016, 16 pages.

German translation of Japanese Application No. 2014-541640, Office Action, dated Nov. 14, 2016, with partial English translation.

* cited by examiner

USE OF N,N'-(DIMETHYL) URONES AND METHOD FOR CURING EPOXY RESIN COMPOSITIONS

PRIOR RELATED APPLICATIONS

This application is a National Phase application of International Application No. PCT/EP2012/072593, filed Nov. 14, 2012, which claims priority to German Patent Application No. 10 2011 118 760.3, filed Nov. 15, 2011, each of which is incorporated herein by reference in its entirety.

The present invention relates to the use of bis- or multifunctional N,N'-(dimethyl)-urones as curing agents for the controlled curing of epoxy resin compositions, to a method for the controlled curing of epoxy resin compositions, and to epoxy resin compositions comprising bis- or multi-functional N,N'-(dimethyl)-urones for the production of mouldings.

The use of thermosetting epoxy resins is widespread owing to their good resistance to chemicals, their very good thermal and dynamic-mechanical properties and their high electrical insulating capacity. In addition, epoxy resins exhibit good adhesion to many substrates and are accordingly highly suitable for use in fibre composites. For use in fibre composites, both good wetting of the fibres, that is to say a low viscosity of the chosen resin formulation for producing the composite, and high mechanical properties are desirable.

Various processes are used to produce mouldings from fibre composites, such as, for example, the prepreg process, various infusion or injection processes, in particular the RTM process (resin transfer moulding). Of those processes, the infusion or injection processes in particular have gained importance in recent years. For example, in the infusion processes, in which dry reinforcing materials, such as, for example, fibre mats, nonwovens, fabrics or knitted fabrics, located in an open mould are covered with an impervious vacuum film and, after application of the vacuum, are impregnated with resin formulations by way of distributor channels. These processes have the advantage that large elements with complex geometries can be moulded in a short time.

The curing of epoxy resins takes place by various mechanisms. In addition to curing with phenols or anhydrides, curing is frequently carried out with amines. These substances are mostly liquid and can be mixed with epoxy resins very well. Owing to their high reactivity and accordingly very low latency, such epoxy resin compositions are produced in two-component form. This means that the resin (A component) and the curing agent (B component) are stored separately and are not mixed in the correct ratio until shortly before use. "Latent" here means that a mixture of the individual components is stable under defined storage conditions. These two-component resin formulations are also referred to as cold-curing resin formulations, the curing agents used therefor mostly being chosen from the group of the amines or amidoamines.

One-component, hot-curing epoxy resin formulations, on the other hand, are prefabricated in ready-for-use form, that is to say the epoxy resin and the curing agent are mixed by the manufacturer. Mixing errors of the individual components during use on site are therefore excluded. A precondition thereof are latent curing agent systems, which do not react (are storable) with the epoxy resin at room temperature but react readily when heated, according to the energy input. A particularly suitable and also inexpensive curing agent for such one-component epoxy resin formulations is, for example, dicyandiamide. Under ambient conditions, corresponding resin/curing agent mixtures can be stored ready-for-use for up to 12 months.

Urones have long been known as curing accelerators for the accelerated curing of epoxy resins. Urones are thus used in a large number of applications in combination with latent curing agents such as, for example, dicyandiamide. The use of dicyandiamide as a latent curing agent in combination with a wide variety of urones as curing accelerators is thus also described in a large number of patent applications. Reference may be made in this context, for example, to the following documents EP 603131 A1, EP 429395 A2, U.S. Pat. Nos. 2,993,044 A, 3,386,956 A, 3,789,071, EP 2295483 A1, WO 2004/106402 A1, WO 2007/062853 A1.

Unfortunately, epoxy resin mixtures with highly latent dicyandiamide or other highly latent curing agents have the disadvantage that such epoxy resin mixtures cure very quickly and with a high heat output, that is to say with the release of large amounts of energy. This effect is all the more marked when dicyandiamide and a curing accelerator, such as, for example, a urone, are used for the curing of epoxy resin mixtures. This fact represents a considerable problem for experts concerned with the construction and production of mouldings, because the mouldings, according to the layer thickness, acquire internal stresses with the energy that is released. These internal stresses lead to cracks in the mouldings, as a result of which the mouldings do not achieve the required mechanical stability. If the heat output is much too high in dependence on the layer thickness, carbonisation can even be observed in isolated cases, as a result of which the moulded articles become wholly unusable.

The use of composite components as a replacement for metal or wood components, such as, for example, in wind power plants, is becoming increasingly more relevant. For example, the manufacturers of wind power plants are planning ever larger units, which are driven by larger rotor blades. In the production of these rotor blades, the heat formed in the production process must be dissipated as effectively and evenly as possible so that the component is not damaged thermally during the production process. This can be ensured only unsatisfactorily when using epoxy resin compositions that comprise as the curing system dicyandiamide as the curing agent and urones as the curing accelerator, because these systems react very quickly and give off large amounts of heat within a very short time. Although the reaction rate can be controlled to a certain extent by curing at lower temperatures, a build-up of heat as a result of inadequate heat dissipation is very quickly observed in large and solid components having large layer thicknesses of epoxy resins, such as, for example, rotor blades. This has the result that the curing reaction accelerates in an uncontrolled manner. Ultimately, this leads to thermal damage in the component.

For the stress-free production of large and solid structural components, they must be cured as evenly as possible and thus also more slowly. This can be achieved to only a limited extent with the conventional curing systems of urones as accelerator and dicyandiamide as curing agent, because a local build-up of heat and accordingly uneven curing can occur as a result of uneven heat dissipation. This risk is present in particular in the case of irregular components.

The object underlying the present invention is, therefore, to provide a method for the controlled curing of epoxy resin compositions, in particular for solid components having large layer thicknesses of epoxy resin, and the epoxy resin compositions required therefor. By means of this method, even curing over a given period of time is to be possible without the occurrence of internal stresses or other thermal damage in the mouldings or components that are to be produced.

These objects are achieved by a method and use according to claim 1 and 2 of the present invention.

Thus, according to a first embodiment, the present invention provides the use of bis- or multi-functional N,N'-(dimethyl)-urones of the general formula (I) or mixtures thereof as curing agents for the controlled curing of epoxy resin compositions

wherein
R=a linear or branched aliphatic radical, or
an unsubstituted, halo-substituted and/or alkyl-substituted aromatic radical, and
n=a number from 2 to 20, wherein the epoxy resin composition comprises at least one curable epoxy resin, and wherein the epoxy resin composition comprises the N,N'-(dimethyl)-urone of the general formula (I) or mixtures thereof in an amount that, during curing at a temperature of from 60 to 180° C., generates a maximum heat flow in the epoxy resin composition of from 0.05 to 0.99 W/g (based on the mass of the epoxy resin composition), so that the epoxy resin composition cures fully. Preferably, the epoxy resin composition does not comprise any further curing agents, co-curing agents, curing accelerators or other catalysts for the curing of epoxy resins apart from the N,N'-(dimethyl)-urone of the general formula (I) or mixtures thereof.

According to a second embodiment, the present invention accordingly also provides a method for the controlled curing of epoxy resin compositions as well as a method for the production of composites, by means of at least one bis- or multi-functional N,N'-(dimethyl)-urone of the general formula (I) or mixtures thereof as curing agent

wherein
R=a linear or branched aliphatic radical, or
a cycloaliphatic radical, or
an unsubstituted, halo-substituted and/or alkyl-substituted aromatic radical, and
n=a number from 2 to 20, wherein the epoxy resin composition comprises at least one curable epoxy resin, and wherein the epoxy resin composition comprises the N,N'-(dimethyl)-urone of the general formula (I) or mixtures thereof in an amount that, during curing at a temperature of from 60 to 180° C., generates a maximum heat flow in the epoxy resin composition of from 0.05 to 0.99 W/g (based on the mass of the epoxy resin composition), so that the epoxy resin composition cures fully. Preferably, the epoxy resin composition does not comprise any further curing agents, co-curing agents, curing accelerators or other catalysts for the curing of epoxy resins apart from the N,N'-(dimethyl)-urone of the general formula (I) or mixtures thereof.

According to an alternative embodiment, the present invention also provides the use of a bis- or multi-functional N,N'-(dimethyl)-urone of the general formula (I) or mixtures thereof as curing agent for the controlled curing of epoxy resin compositions, as well as a method for the controlled curing of epoxy resin compositions by means of at least one bis- or multi-functional N,N'-(dimethyl)-urone of the general formula (I) or mixtures thereof as curing agent, as well as a method for the production of composites by means of at least one bis- or multi-functional N,N'-(dimethyl)-urone of the general formula (I) or mixtures thereof as curing agent

wherein
R=a linear or branched aliphatic radical, or
a cycloaliphatic radical, or
an unsubstituted, halo-substituted and/or alkyl-substituted aromatic radical, and
n=a number from 2 to 20, wherein the epoxy resin composition comprises at least one curable epoxy resin and does not comprise any further curing agents, co-curing agents, curing accelerators or other catalysts for the curing of epoxy resins apart from the N,N'-(dimethyl)-urone of the general formula (I) or mixtures thereof. Preferably, the epoxy resin composition comprises the N,N'-(dimethyl)-urone of the general formula (I) or mixtures thereof in an amount such that the epoxy resin composition cures fully, and particularly preferably in an amount that, during curing at a temperature of from 60 to 180° C., generates in the epoxy resin composition a maximum heat flow of from 0.05 to 0.99 W/g (based on the mass of the epoxy resin composition), so that the epoxy resin composition cures fully.

Surprisingly, it has been found that, by using N,N'-(dimethyl)-urone of the general formula (I) or mixtures thereof, in particular as the sole curing agents, and by purposively establishing a maximum heat flow of from 0.05 to 0.99 W/g, it is possible for the first time to provide a method which permits a particularly low-stress curing of epoxy resin compositions. No cracks or other thermal damage are to be found in the mouldings thus produced using these urones. Curing takes place particularly evenly over a given period of time, as a result of which no local overheating or heat build-up is observed. In addition, it was not to be foreseen that curing would take place completely, that is to say that complete polymerisation of the epoxy resins would take place so that the epoxy resins cure fully. Accordingly, it is also possible to provide a method for the production of mouldings which ensures a high quality standard in relation to the mouldings to be produced.

The maximum heat flow is measured according to the invention in particular isothermally using a heat flow differential calorimeter (DSC822e, Mettler Toledo) and the peak maximum is determined as the maximum heat flow. Test conditions that are to be observed are mentioned in the examples.

Accordingly, it is also possible to provide a method for the rapid but gentle curing of solid components, wherein the heat flow is adapted to the component to be cured by the choice of specific urones used as the sole curing agents. It is thus possible, on the one hand, for irregular components to be cured as evenly and thus as stress-free as possible. On the other hand, the curing rate can be so optimised that the production process takes place as quickly as possible but without thermal damage to the component.

According to a particular embodiment, the present invention accordingly also provides the use of N,N'-(dimethyl)-urones of the general formula (I) as curing agent for the controlled curing of epoxy resin compositions, or a method for the curing of epoxy resin compositions using N,N'-(dimethyl)-urones of the general formula (I) as curing agent, wherein the epoxy resin composition has a layer thickness of at least 0.5 mm, in particular at least 2 mm, in particular at least 4 mm, in particular at least 10 mm, in particular at least 20 mm, particularly preferably at least 50 mm and most particularly preferably of at least 100 mm. At the same time or independently thereof, the layer thickness can be not more than 1000 mm, in particular not more than 500 mm.

The choice of the suitable urone for a formulation is made according to the desired curing rate, the desired curing temperature and/or the possibility of dissipating the heat of reaction that forms as uniformly as possible. Aromatic urones have high reactivity, in which the amount of heat that forms in the exothermic reaction is given off in a short time unit (high maximum heat flow). Aliphatic urones, on the other hand, have significantly lower reactivity, in which the amount of heat that forms is given off over a long period of time (low maximum heat flow).

In connection with the present invention, a bis- or multifunctional N,N'-(dimethyl)-urone is to be understood as being a substance which has the structure represented by formula (I). The functionality is determined solely by the number of dimethylurea substituents or radicals. Furthermore, a dimethylurea substituent or radical is to be understood in the following as being a radical or substituent according to formula —(NH—CO—N(CH$_3$)$_2$).

In a first preferred embodiment there are used according to the invention N,N'-(dimethyl)-urones of formula (I) wherein R is a linear or branched aliphatic radical. Such compounds have low reactivity, so that the amount of heat that forms is given off over a long period of time (low maximum heat flow).

The radical R in compounds of formula (I) can be a linear or branched aliphatic radical. According to the present invention, a linear or branched aliphatic radical can be a linear or branched alkyl radical having a chain length of up to 20 carbon atoms, in particular an alkyl radical which has the general formula $C_xH_{2x+2-n}$, wherein x=from 1 to 20, preferably x=from 1 to 10, and n denotes the number of dimethylurea substituents with n=an integer from 2 to 20. It is further preferably provided that alkyl or this aliphatic radical denotes methyl, ethyl, propyl, butyl, pentyl, hexyl, heptyl, octyl, nonyl or decyl, wherein these alkyl radicals can further preferably also be unbranched, branched once, branched several times or alkyl-substituted. Preference is given to such alkyl radicals that are themselves mono- or poly-substituted by C1- to C5-alkyl. C1- to C5-alkyl according to the present invention can denote methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl or 1-ethylpropyl.

Also preferably, an alkyl radical, in particular methyl, ethyl, propyl, butyl, can itself also be substituted, in particular polysubstituted, by a C3- to C15-cycloalkyl radical, wherein C3- to C15-cycloalkyl has the meaning given below.

It is to be emphasised here that the dimethylurea substituents (number of dimethylurea substituents n=from 2 to 20) can be substituents of the alkyl or basic structure as well as substituents of a C1- to C5-alkyl substituent or of a C1- to C15-cycloalkyl substituent.

In a further embodiment, there are preferably used N,N'-(dimethyl)-urones of the general formula (I) wherein R comprises a cycloaliphatic radical.

The radical R in compounds of formula (I) can also be a cycloaliphatic radical. The cycloaliphatic radical preferably has from 3 to 20 carbon atoms. According to the present invention, a cycloaliphatic radical can denote in particular C3- to C20-cycloalkyl, preferably C3- to C15-cycloalkyl. R can further preferably denote a monocyclic or bicyclic cycloalkyl radical having from 3 to 15 carbon atoms. In particular, C3- to C20-cycloalkyl, preferably C3- to C15-cycloalkyl, denotes a cycloalkyl radical which has the general formula $C_xH_{2x-n}$, wherein x=from 1 to 20 and n denotes the number of dimethylurea substituents with n=an integer from 2 to 20. Also preferably, C3- to C15-cycloalkyl can denote cyclopropyl, cyclobutyl, cyclopentyl, cyclohexyl or cycloheptyl, wherein these cycloalkyl radicals can themselves also preferably be mono- or poly-substituted by C1- to C5-alkyl radicals having the meaning given above. It is to be emphasised here that the dimethylurea substituents (number of dimethylurea substituents n=from 2 to 20) can be substituents of the cycloalkyl basic structure as well as substituents of a C1- to C5-alkyl radical.

In a further embodiment of the invention, there are preferably used N,N'-(dimethyl)-urones of the general formula (I) wherein R is an unsubstituted, halo-substituted and/or alkyl-substituted aromatic radical. Such aromatic urones have high reactivity, so that the amount of heat that forms is given off over a short period of time (high maximum heat flow).

The radical R in compounds of formula (I) can also be an unsubstituted, halo-substituted and/or alkyl-substituted aromatic radical.

Halogen can denote in particular fluorine, chlorine or bromine.

According to the present invention, an unsubstituted, halo-substituted and/or alkyl-substituted aromatic radical, in particular having from 1 to 4 rings, can be used. Particular preference is given to phenyl and naphthyl radicals having n=from 2 to 4 dimethylurea radicals according to the general formula (II) or formula (III).

An unsubstituted, halo-substituted and/or alkyl-substituted aromatic radical can be in particular a radical of the general formula (II) or formula (III)

Formula (II)

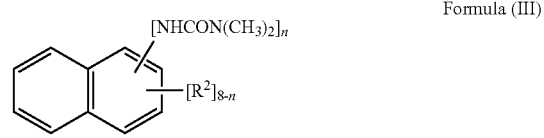

Formula (III)

wherein, simultaneously or independently, $R^2$=at each occurrence, independently of one another, selected from H, halogen and alkyl, n=2, 3 or 4.

Halogen is preferably fluorine, chlorine or bromine.

Alkyl is preferably C1- to C5-alkyl.

According to the present invention, n can denote a number from 2 to 20, that is to say compounds having from 2 to 20 dimethylurea radicals can be used according to the invention. Preferably n is an integer from 2 to 10 and more preferably n is an integer from 2 to 8, and yet more preferably n is 2 or 3. Accordingly, there can be used according to the present invention in particular N,N'-(dimethyl)-diurones, N,N'-(dimethyl)-triurones or N,N'-(dimethyl)-oligourones of the general formula (I), or mixtures thereof, having two, three or up to 20 dimethylurea radicals. Particular preference is given to N,N'-(dimethyl)-diurones where n=2 and N,N'-(dimethyl)-triurones where n=3. Moreover, preference is also given to oligourones where n=from 4 to 20, wherein n can be a number from 4 to 20. It is to be emphasised that the choice of the basic structure is of lesser importance.

Most particularly preferably there can be used according to the present invention N,N'-(dimethyl)-urones of the general formula (I) selected from the group bis[4-(N,N)-dimethylurea)-cyclohexyl]methane (H12MDI-urone), 1,1-hexamethylenebis[3,3]dimethylurea] (HDI-urone), N,N''-1,5-naphthalenediylbis[N',N'-dimethylurea] (NDI-urone), 1,1'-m-xylylenebis(3,3-dimethylurea) (MXDI-urone), N,N''-1,4-phenylenebis[N',N'-dimethylurea] (PDI-urone), 4,4'-methylene-diphenylenebis(dimethylurea) (MDI-urone), 1-(N,N-dimethylurea)-3-(N,N-dimethylureamethyl)-3,5,5-trimethylcyclohexane (IPDI-urone) and/or mixtures thereof.

It is further preferred according to the present invention that at least two different N,N'-(dimethyl)-urones of the general formula (I) are used as curing agent.

It has been found according to the invention in particular that N,N'-(dimethyl)-urones of the general formula (I) can be used as the sole curing agents in epoxy resin compositions. Accordingly, these epoxy resin compositions can be free of further curing agents, co-curing agents, curing accelerators and/or catalysts for the curing of epoxy resins.

According to the invention, the epoxy resin compositions can be free of such substances, that is to say in particular comprise a content of ≤1 wt. %, yet more preferably ≤0.1 wt. %, yet more preferably ≤0.001 wt. % and yet more preferably of 0 wt. % of such compounds, based on the total weight of the epoxy resin composition.

In a preferred embodiment, the epoxy resin composition as a whole does not comprise any further curing agents and/or co-curing agents apart from the alkyl or dialkyl semicarbazones of the general formula (I). In particular, the epoxy resin composition is free of further curing agents and/or co-curing agents. Conventional curing agents and/or co-curing agents are, for example, aliphatic, cycloaliphatic and aromatic amines, polyamines, amidoamines, polyamides, ketimines, mercaptans, isocyanates, anhydrides, carboxylic acids, polyphenols, amino resins and phenolic resins as well as dicyandiamide.

Free of further curing agents and/or co-curing agents means in particular that the system as a whole has a total content of further compounds that can be regarded as curing agents and/or co-curing agents of less than 1 wt. %, based on the total epoxy resin composition, in particular of less than 0.1 wt. %, yet more preferably of less than 0.01 wt. % and particularly preferably of 0 wt. %.

In a further embodiment, the epoxy resin composition according to the invention is free of curing accelerators and/or catalysts for the curing of epoxy resins. Conventional curing accelerators and/or catalysts for the curing of epoxy resins are, for example, tertiary amines, imidazoles, urones, compounds based on boron trifluoride, titanate compounds.

Free of further curing accelerators and/or catalysts for the curing of epoxy resins means in particular that the system as a whole has a total content of further compounds that can be regarded as curing accelerators and/or catalysts for the curing of epoxy resins of less than 1 wt. %, based on the total epoxy resin composition, in particular of less than 0.1 wt. %, yet more preferably of less than 0.01 wt. % and particularly preferably of 0 wt. %.

In the most preferred embodiment, the epoxy resin composition is free of further curing agents, co-curing agents, curing accelerators and catalysts for the curing of epoxy resins apart from the alkyl or dialkyl semicarbazones of the general formula (I).

In a further development of the present invention, the present invention also provides epoxy resin compositions for the production of mouldings comprising a) at least one curable epoxy resin and b) at least one curing agent for epoxy resins selected from the group of the bis- or multifunctional N,N'-(dimethyl)-urones of the general formula (I) or mixtures thereof.

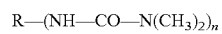  Formula (I)

wherein
R=a linear or branched aliphatic radical, or
  a linear or branched cycloaliphatic radical, or
  an unsubstituted, halo-substituted and/or alkyl-substituted aromatic radical, and
n=a number from 2 to 20, Preferably, the epoxy resin composition does not comprise any further curing agents, co-curing agents, curing accelerators or other catalysts for the curing of epoxy resins apart from the curing agent from the group of the N,N'-(dimethyl)-urones of the general formula (I) or mixtures thereof. Also preferably, the epoxy resin composition comprises the curing agent from the group of the N,N'-(dimethyl)-urones of the general formula (I) or mixtures thereof in an amount that, during curing of the epoxy resin composition at a temperature of from 60 to 180° C., generates a maximum heat flow in the epoxy resin composition of from 0.05 to 0.99 W/g (based on the mass of the epoxy resin composition), so that the epoxy resin composition cures fully.

The present invention is not subject to any limitation as regards the curable epoxy resins. There are suitable in particular all commercially available products that conventionally comprise more than one 1,2-epoxide group (oxirane) and can be saturated or unsaturated, aliphatic, cycloaliphatic, aromatic or heterocyclic. The epoxy resins can additionally contain substituents such as halogens, phosphorus groups and hydroxyl groups. Epoxy resins based on glycidyl polyether of 2,2-bis(4-hydroxyphenyl)-propane (bisphenol A) and the bromine-substituted derivative (tetrabromobisphenol A), glycidyl polyether of 2,2-bis(4-hydroxyphenyl)methane (bisphenol F) and glycidyl polyether of novolaks as well as those based on aniline or substituted anilines such as, for example, p-aminophenol or 4,4'-diaminodiphenylmethanes can be cured particularly well by using the curing agents according to the invention.

A preferred epoxy resin composition accordingly comprises as the curable epoxy resin in particular at least one epoxy resin from the group of the epoxy resins based on glycidyl polyether of 2,2-bis(4-hydroxyphenyl)propane (bisphenol A), its bromine-substituted derivative (tetrabromobisphenol A), glycidyl polyether of 2,2-bis(4-hydroxyphenyl)-methane (bisphenol F) and/or glycidyl polyether of novolak resins.

The amount of the curing agents according to the invention that is used can further preferably be adjusted to from 0.01 to 15 parts of N,N'-(dimethyl)-urone according to formula (I) or mixtures thereof per 100 parts of resin, preferably from 0.1 to 15 parts, preferably from 1 to 15 parts and most particularly preferably from 2 to 15 parts per 100 parts of resin. Also preferred are amounts in which there are used, per 100 parts of resin, from 1 to 12 parts, in particular from 2 to 12 parts, more preferably from 3 to 12 parts, particularly preferably from 4 to 12 parts and most particularly preferably from 5 to 12 parts of N,N'-(dimethyl)-urone according to formula (I) or mixtures thereof.

A combination of a plurality of curing agents according to the invention, in particular in the ratio indicated herein, is also covered by this invention.

With these amounts it is possible according to the invention to generate, at a temperature of from 60 to 180° C., a maximum heat flow in the epoxy resin composition of from 0.05 to 0.99 W/g (based on the mass of epoxy resin), so that the epoxy resin composition cures fully.

According to the present invention, an epoxy resin composition can accordingly preferably comprise from 0.01 to 10 wt. % (based on the mass of the epoxy resin composition) N,N'-(dimethyl)-urone according to formula (I) or mixtures thereof. Particular preference is given to epoxy resin compositions that comprise at least 0.01 wt. %, in particular at least 0.1 wt. %, particularly preferably at least 1.0 wt. %, and at the same time not more than 10 wt. %, in particular not more than 8 wt. %, and most particularly not more than 7 wt. %, N,N'-(dimethyl)-urone according to formula (I) or mixtures thereof.

According to a preferred epoxy resin composition or the method or use described herein, it is in particular also provided according to the present invention that the epoxy resin composition comprises the N,N'-(dimethyl)-urone of the general formula (I) or mixtures thereof in an amount that, during curing at a temperature of from 60 to 180° C., in particular from 60 to 160° C. and most particularly preferably from 60 to 150° C., generates a maximum heat flow in the epoxy resin composition of from 0.05 to 0.99 W/g (based on the mass of the epoxy resin composition), so that the epoxy resin composition cures fully. It can, however, also be provided that the epoxy resin composition comprises the N,N'-(dimethyl)-urone of the general formula (I) or mixtures thereof in an amount that, during curing at a temperature of from 80 to 160° C., in particular from 90 to 160° C. and most particularly preferably from 100 to 160° C., generates a maximum heat flow in the epoxy resin composition of from 0.05 to 0.99 W/g (based on the mass of the epoxy resin composition), so that the epoxy resin composition cures fully.

At the same time or independently thereof, it can be provided that the amount of N,N'-(dimethyl)-urones of the general formula (I) or mixtures thereof generates a maximum heat flow in the epoxy resin composition of from 0.05 to 0.99 W/g, in particular from 0.05 to 0.80 W/g, particularly preferably from 0.05 to 0.70 W/g and most particularly preferably from 0.05 to 0.60 W/g (based on the mass of the epoxy resin composition), so that the epoxy resin composition cures fully.

According to the invention, the epoxy resin composition cures fully. This means in particular that the epoxy resin composition cures to the extent of ≥80%, preferably ≥90%, more preferably ≥95%, yet more preferably ≥98%, in particular ≥99% and most preferably 100%. Accordingly, the epoxy groups in the cured epoxy resin composition have reacted to the extent of in particular ≥80%, preferably ≥90%, more preferably ≥95%, yet more preferably ≥98%, in particular ≥99% and most preferably 100%.

The proportion of unreacted epoxy groups in the cured epoxy resin composition is in particular <20%, preferably <10%, more preferably <5%, yet more preferably <2%, in particular <1% and most preferably 0%.

The curing profile of the formulations according to the invention can be varied by the addition of further commercially available additives, as are known to the person skilled in the art for the curing of epoxy resins. Additives for improving the processability of the uncured epoxy resin compositions or for adapting the thermo-mechanical properties of the thermosetting products to the requirements profile include, for example, reactive diluents, fillers, rheology additives such as thixotropic agents or dispersing additives, defoamers, colourants, pigments, impact modifiers, impact improvers or fireproofing additives.

Epoxy resin formulations comprising the curing agents according to the invention are suitable for both manual and machine processing methods and in particular for the production of impregnated reinforcing fibres and composites, as are described inter alia in the works of G. W. Ehrenstein, Faserverbund-Kunststoffe, 2006, 2nd edition, Carl Hanser Verlag, Munich, Chapter 5, page 148ff, and M. Reyne, Composite Solutions, 2006, JEC Publications, Chapter 5, page 51ff. Apart from use in prepreg processes, handling in infusion and injection processes is a preferred form of processing. The generally very good miscibilities of the curing agents according to the invention in the epoxy resins are advantageous here.

The present invention accordingly also provides the use of epoxy resin compositions of the type described above in the production of mouldings, in particular hollow articles. This use is directed in particular to the production of mouldings, in particular hollow articles, which have a layer thickness or wall of from 4 to 1000 mm, in particular of at least 10 mm, preferably at least 50 mm and yet more preferably at least 100 mm, and in particular up to 500 mm.

Owing to the advantageous application properties of the curing agents according to the invention and their inexpensive production and, associated therewith, an advantageous cost-benefit ratio, they are particularly suitable for the production of mouldings, composites or other solid components. Accordingly, the present invention also provides a composite material or moulding which comprises a reinforcing and/or carrier material and an epoxy resin composition of the type described above.

All conventional reinforcing materials can be used as the reinforcing material. However, particular mention may be made, without implying any limitation, of: fibres of glass, carbon, aramid and wood, and natural fibres.

The present invention is explained in the following with reference to examples, but the invention is not to be interpreted as being reduced to the examples. Instead, the present invention likewise encompasses any combination of preferred embodiments.

EXAMPLES

1) Substances used:
Epoxy Resin:
Epikot 828 LVEL (E.828, Momentive): bisphenol A liquid resin (EEW 182-187)
Curing Agents:
S1 (AlzChem AG): Bis[4-(N,N-dimethylurea)cyclohexyl] methane
CAS: 52188-81-5 (H12MDI-urone)
S2 (AlzChem AG): 1,1'-Hexamethylenebis[3,3-dimethylurea]
CAS: 20575-76-2 (HDI-urone)
S4 (AlzChem AG): N,N''-1,5-Naphthalenediylbis[N',N'-dimethylurea]
CAS: 73019-17-7 (NDI-urone)
S5 (AlzChem AG): 1,1'-m-Xylylenebis(3,3-dimethylurea)
CAS: 16578-48-6 (MXDI-urone)
S6 (AlzChem AG): N,N''-1,4-Phenylenebis[N',N'-dimethylurea]
CAS: 89305-77-1 (PDI-urone)

VP114 (AlzChem AG): 4,4'-Methylenediphenylene bis(dimethylurea)

CAS: 10097-09-3 (MDI-urone)

VP115 (AlzChem AG): 1-(N,N-Dimethylurea)-3-(N,N-dimethylureamethyl)-3,5,5-trimethylcyclohexane CAS: 39992-90-0 (IPDI-urone)

DCD (DYHARD® 100S, AlzChem AG): Dicyandiamide (<10 μm)

CAS: 461-58-5

VP 115

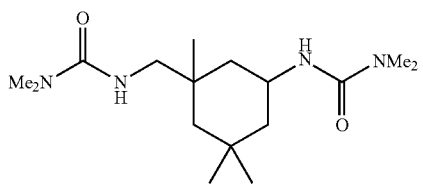

VP 114

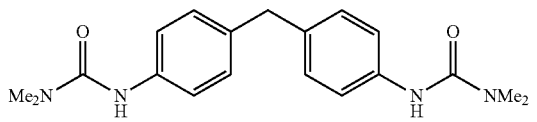

S1

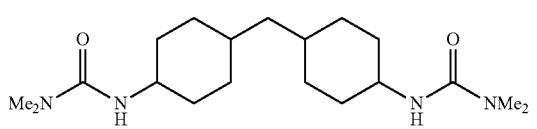

S4

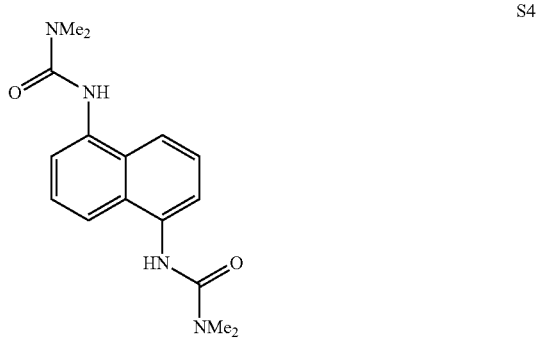

S2

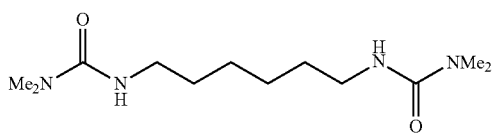

S5

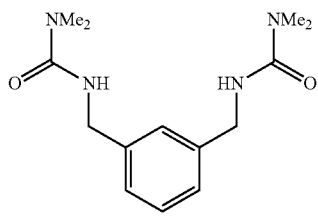

S6

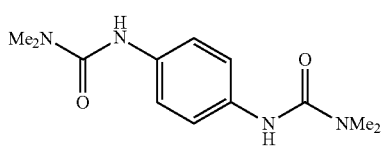

2) The data and measured values mentioned in the following examples were obtained by the following measuring methods:

a. Carrying out the DSC measurements by means of a heat flow differential calorimeter (DSC822e, Mettler Toledo):

i. dynamically: As the temperature programme for determining the peak temperature (DSC peak T), heating from 30 to 250 (if required to 400° C.) is carried out at a rate of 10 K/min. The onset temperature is determined from the same measurement by applying the tangent to the reaction peak. The energy content is calculated from the same measurement by integration of the area under the peak.

ii. isothermally: For determining the isothermal reaction time and the maximum heat flow (peak in the case of isothermal DSC measurement at a given temperature), the sample is heated from 30° C. to the indicated desired temperature T at a rate of 20 K/min and then kept constant for time t. The reaction is complete when the heat flow has reached the base line at the given temperature again after the maximum. In the evaluation of the change over time, the positive peak corresponds to the maximum heat flow of the curing reaction. The integrated area under the peak of the same measurement is the energy content of the reaction. The onset temperature is determined from the same measurement by applying the tangent to the reaction peak.

iii. Measurement of the glass transition temperature (Tg):

maximum glass transition temperature (end Tg):

The material from the gel time determination was used for determining the maximum glass transition temperature (end Tg). The formulation was cured fully by heating to 200° C. and maintaining the temperature for 10 minutes (temperature programme: 30° C. to 200° C., heating rate: 20 K/min, hold: 10 min). After cooling to 50° C., the sample was heated to 200° C. twice with a heating rate of 20 K/min (2×[temperature programme: 50° C. to 200° C., heating rate: 20 K/min, hold: 10 min], cooling rate: −20 K/min) and the end Tg was determined by applying the tangent in the point of inflection of the greatest change in the heat capacity. The arithmetic mean was calculated from the two end Tg's determined.

glass transition temperature of a test specimen (Tg):

In order to determine the Tg of a test specimen cured at a given temperature, the material was heated to 250° C. (temperature programme: 30° C. to 250° C., heating rate: 10 K/min). The Tg was determined by applying the tangent in the point of inflection of the greatest change in the heat capacity in the heating curve.

b. Determining the gel time

About 0.5 g of the freshly prepared formulations was weighed into an aluminium crucible and heated in a heating block preheated to 140° C., the time for heating being measured by means of a stopwatch. By stirring with a toothpick, the time at which the formulation becomes gel-like and the crucible can be lifted from the heating block using the toothpick is determined.

c. Determining the storage stability:

As the start value (0 h), the dynamic viscosities of the freshly prepared formulations were first determined at 25° C. by means of a Haake viscometer (cone (1°)/plate method). The samples were then stored at the required temperature (room temperature: climatic cabinet (T=23° C., rel. humidity=50%; higher temperatures: oven at indicated temperature) and the viscosity was measured at regular intervals, again at 25° C.

3) Process for the preparation of a resin formulation for test specimens for mechanical tests, for thermodynamic tests and tests of storage stability.

a. 600 g of E.828 and 48 g (0.182 mol, 8 phr) of micronised UR 500 (3,3'-(4-methyl-1,3-phenylene(bis(1,1-dimethylurea)) are weighed into a 1-litre dissolver vessel. The reaction mixture is dispersed at 1500 rpm for 30 minutes using a dissolver (Dispermat, VMA-Getzmann). The mixture obtained is then degassed in vacuo (about 30 mbar) for about 2 hours at 50-60 rpm. The formulation is ready to use when there are no more visible bubbles on the surface.

b. 600 g of E.828 and 48 g (0.141 mol, 8 phr) of micronised VP 114 are weighed into a 1-litre dissolver vessel. The reaction mixture is dispersed at 1500 rpm for 30 minutes using a dissolver (Dispermat, VMA-Getzmann). The mixture obtained is then degassed in vacuo (about 30 mbar) for about 2 hours at 50-60 rpm. The formulation is ready to use when there are no more visible bubbles on the surface.

c. 600 g of E.828 and 48 g (0.154 mol, 8 phr) of micronised VP 115 are weighed into a 1-litre dissolver vessel. The reaction mixture is dispersed at 1500 rpm for 30 minutes using a dissolver (Dispermat, VMA-Getzmann). The mixture obtained is then degassed in vacuo (about 30 mbar) for about 2 hours at 50-60 rpm. The formulation is ready to use when there are no more visible bubbles on the surface.

d. 600 g of E.828 and 24 g (0.071 mol, 4 phr) of micronised VP 114 and 24 g (0.077 mol, 4 phr) of micronised VP 115 are weighed into a 1-litre dissolver vessel. The reaction mixture is dispersed at 1500 rpm for 30 minutes using a dissolver (Dispermat, VMA-Getzmann). The mixture obtained is then degassed in vacuo (about 30 mbar) for about 2 hours at 50-60 rpm. The formulation is ready to use when there are no more visible bubbles on the surface.

e. 600 g of E.828 and 24 g (0.071 mol, 4 phr) of micronised VP 114 and 24 g (0.091 mol, 4 phr) of micronised UR 500 are weighed into a 1-litre dissolver vessel. The reaction mixture is dispersed at 1500 rpm for 30 minutes using a dissolver (Dispermat, VMA-Getzmann). The mixture obtained is then degassed in vacuo (about 30 mbar) for about 2 hours at 50-60 rpm. The formulation is ready to use when there are no more visible bubbles on the surface.

f. 600 g of E.828 and 24 g (0.077 mol, 4 phr) of micronised VP 115 and 24 g (0.091 mol, 4 phr) of micronised UR 500 are weighed into a 1-litre dissolver vessel. The reaction mixture is dispersed at 1500 rpm for 30 minutes using a dissolver (Dispermat, VMA-Getzmann). The mixture obtained is then degassed in vacuo (about 30 mbar) for about 2 hours at 50-60 rpm. The formulation is ready to use when there are no more visible bubbles on the surface.

TABLE 1

Epoxy resin compositions according to the invention and their curing behaviour

| Composition no. (according to the invention) | Composition of the resin formulation (parts) | Dyn. DSC peak [° C.] | Dyn. DSC onset [° C.] | Gel time at 140° C. [min:sec] | End Tg [° C.] | Isothermal DSC peak at temp. [min:sec] | Isothermal DSC: max. heat flow at temp. [W/g] |
|---|---|---|---|---|---|---|---|
| 3.a. (yes) | E.828 + UR 500 (100:8) | 177 | 152 | 14:00 | 96 | 140° C./9:05<br>120° C./17:35<br>100° C./36:25<br>80° C./118:35 | 140° C./0.35<br>120° C./0.23<br>100° C./0.13<br>80° C./0.03 |
| 3.b. (yes) | E.828 + VP 114 (100:8) | 184 | 169 | 18:00 | 97 | 140° C./10:35<br>120° C./47:00<br>100° C./141:30<br>80° C./>480:00 | 140° C./0.39<br>120° C./0.18<br>100° C./0.06<br>80° C./0.01 |
| 3.c. (yes) | E.828 + VP 115 (100:8) | 197 | 176 | 32:00 | 101 | 140° C./28:39<br>120° C./130:35<br>100° C./>360:00 | 140° C./0.22<br>120° C./0.06<br>100° C./0.01 |
| 3.d. (yes) | E.828 + VP 114 + VP 115 (100:4:4) | 191 | 163 | 23:00 | 97 | 140° C./14:30 | 140° C./0.21 |
| 3.e. (yes) | E.828 + VP 114 + UR 500 (100:4:4) | 176 | 153 | 14:15 | 98 | 140° C./8:20 | 140° C./0.37 |
| 3.f. (yes) | E.828 + VP 115 + UR 500 (100:4:4) | 187 | 155 | 18:00 | 99 | 140° C./10:55 | 140° C./0.30 |
| S1 (yes) | E.828 + H12MDI-urone (100:8) | 202 | 183 | 40:45 | 99 | 140° C./33:25<br>120° C./107:50 | 140° C./0.15<br>120° C./0.07 |
| S2 (yes) | E.828 + HDI-urone (100:8) | 197 | 175 | 29:50 | 93 | 140° C./29:15<br>120° C./100:35 | 140° C./0.19<br>120° C./0.07 |
| S4 (yes) | E.828 + NDI-urone (100:8) | 190 | 179 | 11:50 | 98 | 140° C./15:30<br>120° C./41:00<br>100° C./154:25 | 140° C./0.24<br>120° C./0.12<br>100° C./0.04 |
| S5 (yes) | E.828 + MXDI-urone (100:8) | 190 | 166 | 22:05 | 93 | 140° C./20:35 | 140° C./0.27 |
| S6 (yes) | E.828 + PDI-urone (100:8) | 200 | 190 | 34:20 | 96 | 140° C./29:50 | 140° C./0.24 |

TABLE 2

Epoxy resin compositions (comparison examples) and their curing behaviour

| Composition no. (according to the invention) | Composition of the resin formulation (parts) | Dyn. DSC peak [° C.] | Dyn. DSC onset [° C.] | Gel time at 140° C. [min:sec] | End Tg [° C.] | Isothermal DSC peak at temp. [min:sec] | Isothermal DSC: max. heat flow at temp. [W/g] |
| --- | --- | --- | --- | --- | --- | --- | --- |
| 3.g. (no) | E.828 + DYHARD 100S (100:6.5) | 198 | 192 | >120:00 | 169 | 170° C./14:30 | 170° C./0.29 140° C./n.a. |
| 3.h. (no) | E.828 + DCD + UR 500 (100:6.5:3) | 143 | 135 | 2:45 | 134 | 140° C./1:17 120° C./5:50 100° C./26:10 80° C./165:40 | 140° C./3.4 120° C./0.95 100° C./0.22 80° C./0.03 |
| 3.i. (no) | E.828 + DCD + VP 114 (100:6.5:3) | 152 | 146 | 3:50 | 143 | 140° C./2:10 120° C./14:30 100° C./72:55 80° C./>480:00 | 140° C./2.79 120° C./0.63 100° C./0.15 80° C./n.a. |
| 3.j. (no) | E.828 + DCD + VP 115 (100:6.5:3) | 162 | 152 | 5:45 | 138 | 140° C./3:45 120° C./18:25 | 140° C./1.54 120° C./0.26 |

TABLE 3

Epoxy resin compositions according to the invention and their curing behaviour - variation of the proportions of curing agent at a curing temperature of 140° C.

| Composition no. (according to the invention) | Composition of the resin formulation (parts) | Dyn. DSC peak [° C.] | Dyn. DSC onset [° C.] | Gel time at 140° C. [min:sec] | End Tg [° C.] | Isothermal DSC peak at temp. [min:sec] | Isothermal DSC: max. heat flow at temp. [W/g] |
| --- | --- | --- | --- | --- | --- | --- | --- |
| 4.a. (yes) | E.828 + VP 114 (100:6) | 182 | 163 | 23:30 | 98 | 140° C./10:50 | 140° C./0.28 |
| 4.b. (yes) | E.828 + VP 114 (100:7) | 182 | 163 | 19:45 | 99 | 140° C./11:25 | 140° C./0.28 |
| 4.c. (yes) | E.828 + VP 114 (100:9) | 182 | 163 | 16:30 | 96 | 140° C./10:30 | 140° C./0.46 |
| 4.d. (yes) | E.828 + VP 114 (100:10) | 181 | 163 | 16:00 | 98 | 140° C./10:50 | 140° C./0.48 |
| 4.e. (yes) | E.828 + VP 114 (100:11) | 180 | 163 | 14:50 | 94 | 140° C./10:30 | 140° C./0.60 |
| 4.f. (yes) | E.828 + VP 115 (100:6) | 197 | 176 | 44:00 | 100 | 140° C./35:15 | 140° C./0.12 |
| 4.g. (yes) | E.828 + VP 115 (100:7) | 197 | 176 | 37:00 | 100 | 140° C./29:30 | 140° C./0.16 |
| 4.h. (yes) | E.828 + VP 115 (100:9) | 198 | 178 | 34:00 | 100 | 140° C./29:05 | 140° C./0.20 |
| 4.i. (yes) | E.828 + VP 115 (100:10) | 196 | 176 | 32:30 | 99 | 140° C./28:05 | 140° C./0.23 |
| 4.j. (yes) | E.828 + VP 115 (100:11) | 196 | 176 | 31:45 | 101 | 140° C./26:20 | 140° C./0.25 |
| 4.k. (yes) | E.828 + UR 500 (100:6) | 174 | 149 | 18:05 | 98 | 140° C./7:15 | 140° C./0.24 |
| 4.l. (yes) | E.828 + UR 500 (100:7) | 174 | 151 | 15:20 | 98 | 140° C./7:25 | 140° C./0.44 |
| 4.m. (yes) | E.828 + UR 500 (100:9) | 175 | 151 | 12:05 | 97 | 140° C./6:35 | 140° C./0.54 |
| 4.n. (yes) | E.828 + UR 500 (100:10) | 173 | 151 | 10:45 | 95 | 140° C./6:35 | 140° C./0.60 |

TABLE 3-continued

Epoxy resin compositions according to the invention and their curing behaviour - variation of the proportions of curing agent at a curing temperature of 140° C.

| Composition no. (according to the invention) | Composition of the resin formulation (parts) | Dyn. DSC peak [° C.] | Dyn. DSC onset [° C.] | Gel time at 140° C. [min:sec] | End Tg [° C.] | Isothermal DSC peak at temp. [min:sec] | Isothermal DSC: max. heat flow at temp. [W/g] |
|---|---|---|---|---|---|---|---|
| 4.o. (yes) | E.828 + UR 500 (100:11) | 174 | 150 | 9:50 | 94 | 140° C./6:15 | 140° C./0.73 |

Compositions 4.a. to 4.o. of Table 4 were prepared correspondingly, as described above for compositions 3.a. to 3.f.

Summary of the results

1) Curing profile of the resin formulations from 3.a to 3.c
   i. The resin formulations prepared according to points 3.a. to 3.c. show in the dynamic DSC measurement that they can also be used as the sole curing agents. It will be seen that the reaction can already start at 100° C., as is shown by example UR 500. The broader but less high curves of the resin formulations with urones as curing agent show a slower curing reaction, in which the energy that is released is distributed over a larger temperature range than in the case of the resin formulations in which the urones are used as accelerator with DCD.
   ii. The resin formulations prepared according to points 3.a to 3.c show in the isothermal DSC measurements that the urones used can be employed as the sole curing agents without DCD. The advantage is that the urones without DCD react more slowly and the amount of heat that is released is distributed over a longer period of time, in contrast to the use of the urones as accelerators of DCD. Depending on the urone used, curing can take place below 80° C., the maximum heat flow not exceeding 0.99 W/g (based on the mass of the epoxy resin mixture).

2) Curing profile of the resin formulations from 3.d to 3.f
   The resin formulations prepared from mixtures of different urones according to points 3.d. to 3.f. show, both in the dynamic DSC measurement and in the isothermal DSC measurement (example at 140° C.), that curing profiles can be adjusted between the resin formulations with only one urone as curing agent, the heat flow in the isothermal DSC measurement being less than 0.99 W/g.

3) Curing profile of the resin formulations from 4.a to 4.o
   i. The resin formulations prepared according to points 4.a. to 4.o. show in the dynamic DSC measurement, independently of the proportion of curing agent, a slower curing reaction, in which the energy that is released is distributed over a larger temperature range than in the case of the resin formulations in which the urones are used as accelerators with DCD.
   ii. The resin formulations prepared according to points 4.a to 4.o show in the isothermal DSC measurements at 140° C. that the urones used achieve a maximum heat flow of <0.99 W/g (based on the mass of the epoxy resin mixture) independently of the proportion of curing agent, as can be seen from the most reactive urone, UR 500 in Ex. 4.o.

Particularly thick and/or unevenly thick components having a thickness >4 mm are difficult to cure. The problem is the sufficient and/or even dissipation of the heat that forms during the exothermal curing process, or of the heat flow that forms in a particularly short time in the case of curing with, for example, dicyandiamide and a urone accelerator, such as DYHARD UR 500. A build-up of heat can thus occur in particularly thick components with thicknesses of from >10 mm to 1000 mm, which damages the component thermally, in extreme cases causing partial or complete carbonisation. Furthermore, too high a heat flow in components having a particularly uneven thickness >4 mm leads to unevenly quick curing within a component, as a result of which particularly great internal stresses build up. Examples of particularly thick and/or unevenly thick mouldings or hollow articles are, for example, in the case of wind power plants the leading edge (>4 mm to >15 mm), in particular the web and spars (>25 mm) and in particular the blade root (>10 mm to >250 mm). By selecting the suitable curing agent of this invention it is possible to adjust the heat flow so that the internal stress of the cured moulding or hollow article is as low as possible and thermal damage and/or partial or complete carbonisation do not occur during the curing process.

The invention claimed is:

1. A method for the controlled curing of epoxy resin compositions comprising
   (i) providing an epoxy resin composition comprising:
      (a) at least one curable epoxy resin; and
      (b) at least one curing agent for epoxy resins selected from the group consisting of bis- or multi-functional N,N'-(dimethyl)-urones of the general formula (I) or mixtures thereof $$R\!-\!(NH\!-\!CO\!-\!N(CH_3)_2)_n \qquad \text{Formula (I)}$$

wherein
R=a linear or branched aliphatic radical, or
   a cycloaliphatic radical, or
   an unsubstituted, halo-substituted and/or alkyl-substituted aromatic radical, and
n =a number from 2 to 20,
wherein the epoxy resin composition has a layer thickness of at least 10 mm, and
wherein the epoxy resin composition does not comprise any further curing agents, co-curing agents, curing accelerators or other catalysts for the curing of epoxy resins apart from the N,N'-(dimethyl)-urone of the general formula (I) or mixtures thereof, and wherein the epoxy resin composition comprises the N,N'-(dimethyl)-urone of the general formula (I) or mixtures thereof in an amount of from 0.1 to 8 wt. % based on the mass of the epoxy resin composition, that during curing at a temperature of from 60 to 160° C., generates a maximum heat flow in the epoxy resin composition of from 0.05 to 0.99 W/g (based on the mass of the epoxy resin composition), so that the epoxy resin composition cures fully; and (ii) curing the epoxy resin composition at a temperature of from 60 to 160° C. so that the epoxy resin composition cures fully, wherein the proportion of unreacted epoxy groups in the cured epoxy resin composition is <2%.

2. The method of claim 1, wherein the epoxy resin composition has a layer thickness of at least 20 mm.

3. The method of claim 1, wherein the epoxy resin is at least one epoxy resin from the group of the epoxy resins based on glycidyl polyether of 2,2-bis(4-hydroxyphenyl) propane (bisphenol A), its bromine-substituted derivative (tetrabromobisphenol A), glycidyl polyether of 2,2-bis(4-hydroxyphenyl)-methane (bisphenol F) and/or glycidyl polyether of novolak resins.

4. The method of claim 1, wherein the N,N'-(dimethyl)-urones of the general formula (I) is bis[4-(N,N-dimethylurea)cyclohexyl]methane (H12MDI-urone), 1,1'-hexamethylenebis[3,3-dimethylurea] (HDI-urone), N,N"-1,5-naphthalenediylbis[N',N'-dimethylurea] (NDI-urone), 1,1'-m-xylylenebis(3,3-dimethylurea) (MXDI-urone), N,N"-1,4-phenylenebis[N',N'-dimethylurea] (PDI-urone), 4,4'-methylenediphenylene bis(dimethylurea) (MDI-urone) and/or 1-(N,N-dimethylurea)-3-(N,N-dimethylureamethyl)-3,5,5-trimethylcyclohexane (IPDI-urone).

5. The method of claim 1, wherein at least two different N,N'-(dimethyl)-urones of the general formula (I) are used as curing agent.

6. The method of claim 1, wherein the epoxy resin composition comprises from 0.01 to 10 wt. % (based on the mass of the epoxy resin composition) N,N'-(dimethyl)-urone according to formula (I) or mixtures thereof.

7. The method of claim 1 for producing mouldings having a layer thickness or wall of from 10 mm to 1000 mm.

8. The method of claim 1 for producing hollow articles having a layer thickness or wall of from 10 to 1000 mm.

9. The method of claim 1, wherein the epoxy resin composition cures to the extent of ≥98%.

10. A method for the controlled curing of epoxy resin compositions comprising (i) providing an epoxy resin composition comprising
(a) at least one curable epoxy resin; and
(b) at least one curing agent for epoxy resins selected from the group consisting of bis- or multi-functional N,N'-(dimethyl)-urones of the general formula (I) or mixtures thereof $$R-(NH-CO-N(CH_3)_2)_n \qquad \text{Formula (I)}$$

wherein
R=a linear or branched aliphatic radical, or
a cycloaliphatic radical, or
an unsubstituted, halo-substituted and/or alkyl-substituted aromatic radical, and
n=a number from 2 to 20,
wherein the epoxy resin composition has a layer thickness of at least 10 mm, and
wherein the epoxy resin composition does not comprise any further curing agents, co-curing agents, curing accelerators or other catalysts for the curing of epoxy resins apart from the N,N'-(dimethyl)-urone of the general formula (I) or mixtures thereof, wherein the epoxy resin composition comprises the N,N'-(dimethyl)-urone of the general formula (I) or mixtures thereof in an amount of from 0.1 to 8 wt. % based on the mass of the epoxy resin composition, that during curing at a temperature of from 60 to 160° C., generates a maximum heat flow in the epoxy resin composition of from 0.05 to 0.99 W/g (based on the mass of the epoxy resin composition), so that the epoxy resin composition cures fully; and (ii) curing the epoxy resin composition at a temperature of from 60 to 160° C. so that the epoxy resin composition cures fully, wherein the epoxy resin composition cures to the extent of ≥98%.

11. The method of claim 1, wherein the epoxy resin composition has a layer thickness of at least 50 mm.

12. The method of claim 10, wherein the epoxy resin composition has a layer thickness of at least 50 mm.

13. The method of claim 1 for producing mouldings having a layer thickness or wall of from 50 mm to 1000 mm.

14. The method of claim 1 for producing hollow articles having a layer thickness or wall of from 50 mm to 1000 mm.

* * * * *